United States Patent [19]

Martin

[11] Patent Number: 4,513,058
[45] Date of Patent: Apr. 23, 1985

[54] IMPACT RESISTANT HIGH AIR RETENTION BLADDERS

[75] Inventor: Robin A. Martin, Park Ridge, Ill.

[73] Assignee: Wilson Sporting Goods Co., River Grove, Ill.

[21] Appl. No.: 601,297

[22] Filed: Apr. 17, 1984

[51] Int. Cl.³ .................... B05D 3/02; B32B 27/40; A63B 41/00
[52] U.S. Cl. ..................... 428/336; 273/65 B; 427/379; 427/393.5; 428/423.5; 428/424.8
[58] Field of Search .......... 273/65 B; 427/379, 393.5; 428/423.5, 424.8, 336

[56] References Cited

U.S. PATENT DOCUMENTS 4,093,219  6/1978  Piraud .................. 273/65 B
4,119,592  10/1928 Murphy ............... 273/65 X Primary Examiner—Michael R. Lusignan

[57] ABSTRACT

The invention relates to methods of manufacturing bladders for footballs comprising (a) applying a thin layer of coating solution to a polyurethane film, said solution consisting of polyvinylidene, ethylene vinyl alcohol, polyamide polymers or vinylidene chloride copolymers, and organic solvents; (b) evaporating said solvents; (c) optionally repeating steps (a) and (b); (d) forming said coated film into a bladder. Said invention also relates to products of said methods.

10 Claims, 2 Drawing Figures

IMPACT RESISTANT HIGH AIR RETENTION BLADDERS

FIELD AND BACKGROUND OF THE INVENTION

The field of this invention is bladders for footballs and other sport balls or bags which are subjected to repeated impacts in use. More specifically, the invention is concerned with an improvement in inflatible polyurethane bladders for footballs and the like.

For many years high performance competition-type footballs have included a leather cover, and, typically, a separate bladder formed of natural or synthetic rubber. In recent years, high performance bladders formed of polyurethane have been marketed. Polyurethane can provide increased durability over rubber for impact type balls. However, even though relatively heavy polyurethane film is used to form the bladder, such as 10 mil film, the bladders tended to lose air at a faster rate than rubber bladders, and therefore require inflation at more frequent intervals.

Laminates of polyurethane with other resin polymers, such as co-extrusion laminates, have been tested experimentally for football bladders. It was found, however, that the durability of the bladders was not acceptable for commercial use, the bladders delaminating within a short time when the balls are subjected to impacts, as occurs with the kicking of footballs. Prior to the present invention, no method has been known of manufacturing polyurethane bladders for footballs and the like which provides high air retention and which are highly impact resistant.

SUMMARY OF INVENTION

The present invention involves a coating procedure for polyurethane film to be used in making inflatible bladders. A coating solution is used containing a resin polymer which when applied to the polyurethane film is capable of decreasing the air ($O_2/N_2$) permeability. The coating polymer is dissolved in an organic carrier solvent which does not dissolve or react with the polyurethane film. As a critical feature of the process, the coating solution also contains a small percent of an attack solvent which is capable of dissolving the polyurethane film. By employing the attack solvent in a critically small amount relative to the total coating solution, greatly improved bonding of the coating resin can be achieved without at the same time dissolving or even appreciably thinning the polyurethane film. The process permits the use of polyurethane film in relatively thin guages, such as 5 mil film, with the application of an air retention coating of a thickness of less than 1 mil. The resulting composites have a very uniform thickness without significant thin or weak spots, providing both high air retention and high impact resistance. Bladders made from such coated films overcome the problem of delamination referred to above.

THE DRAWING

In the accompanying drawing, there is shown an illustrative embodiment of a football bladder which has been manufactured in accordance with the method of this invention.

DETAILED DESCRIPTION

Figure 1:
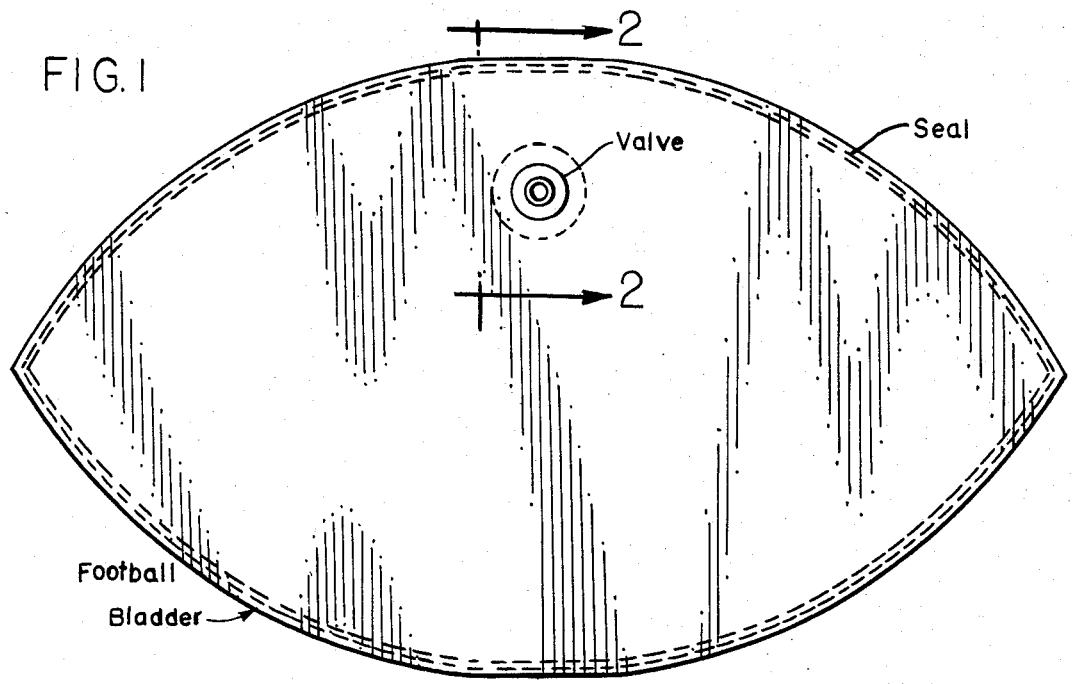
FIG. 1 is a plan view of the football bladder.

This invention relates to a method of manufacturing bladders for sports balls or bags which are subjected to repeated impacts in use. An important use of the bladders of this invention is in footballs, but the bladders are also well adapted for use in other impact type balls and bags, such as soccer balls, punching bags, etc. As used herein the term "footballs or the like" is intended to refer to such balls and bags generically.

The starting material for preparing the inflatible bladders of the present invention is polyurethane film. The film is selected for the properties which make it capable of being formed into high performance bladders. The film may have a thickness of from about 3 to 12 mils, such as, typically, a 5 mil or 10 mil film. For the purpose of the present invention, the thinner guages are preferred, such as polyurethane film of from 3 to 8 mils. Such polyurethane film is readily available commercially. Suitable commercial sources include Deerfield Urethane Co., South Deerfield, Mass., and Elra Industries, Cincinnati, Ohio. As is well known in the plastics art, polyurethanes are made by reaction of diisocyanates with polyhydric alcohols or polyethers. Hydrocyal-terminated polyurethane tri-polymers are the most common thermoplastic material. This invention, however, is not limited to specific polyurethane film compositions, but is generally applicable to polyurethane films capable of being formed into bladders for footballs and the like.

In accordance with this invention, as an initial step in the manufacture of the bladders, a thin layer of a coating solution is applied to one side of the polyurethane film. In general, the coating solution comprises a selected coating resin dissolved in an organic carrier solvent, which also contains a small proportion of an attack solvent. The carrier solvent is selected for its ability to dissolve the coating resin and its inability to dissolve or react with the polyurethane film. The polyurethane film is essentially inert to the carrier solvent. However, the attack solvent which is present in a controlled, limited amount is capable of dissolving the polyurethane.

The general class of coating resins are those which are known to provide decreased air permeability when used as a layer of composites or laminates. For the purpose of the present invention, the preferred coating resins are polyvinylidene polymers and copolymers of vinylidene chloride with other vinyl monomers, and particularly such copolymers formed from vinylidene chloride with a minor proportion of vinyl chloride, sometimes referred to as "Saran" polymers. Other vinyl monomers which may be copolymerized with vinylidene chloride include isobutyl vinyl monomers, and methyl methacrylate. Another vinyl-type polymers which may be used is ethylene vinyl alcohol polymers (referred to as "EVAL" resins), and also polyamide polymers, a preferred subclass of which is referred to as "Nylon" polymers.

The carrier solvent for the coating resin is an organic solvent in which the coating resin is soluble and which is miscible with the attack solvent. The carrier solvent may therefore be varied with the particular coating resin. For polyvinylidene polymers and copolymers, such as vinylidine chloride and vinyl chloride copolymers, ketone carrier solvents may be used. Such ketone solvents include acetone, methylethyl ketone, methylisobutyl ketone, etc. When the coating resins is a polyamide, a ketone solvent may also be employed. A particularly desirable solvent mixture is pyrrolidine and acetone. For ethylene vinyl alcohol polymers, alcohol solvents may be used, such as isopropyl or butyl alcohols.

The attack solvent is selected from the class of solvents known to be capable of dissolving or solubilizing polyurethane resins. These include particularly tetrahydrofuran, dimethyl formamide, and dimethyl sulfoxide. It should be understood, however, that this list is not intended to be exhaustive. Another characteristic of the attack solvent is that it should be miscible with the carrier solvent. In this case, only a minor proportion of the attack solvent is utilized. Based on the coating solution, containing the carrier solvent, the coating resin, and the attack solvent, the weight percent of the attack solvent should be within the range from about 3 to 18% by weight. A preferred range is from about 5 to 15% by weight based on the coating solution. By limiting the concentration of the attack solvent, a fusion-type attachment can be obtained between the coated layer and the polyurethane film without at the same time producing thin or mechanically weak spots in the polyurethane film. The resulting composite will therefore be of relatively uniform thickness.

The applied coating layer may have an average thickness within the range from about 0.3 to 1.2 mils. A preferred range is from about 0.3 to 0.8 mils, such as approximately 0.5 mil coating on a polyurethane film of 5 mil thickness.

The concentration of the resin in the coating solution is highly critical, but may range from about 25 to 45 weight percent. For example, a preferred concentration range is from about 30 to 40 wt. %. The concentration of the carrier solvent may vary over a considerable range, such as from about 50 to 70 wt. % of the coating solution. In preferred embodiments, the carrier solvent will usually range from about 50 to 60 wt. %.

The coating solution is applied to one side of the polyurethane film by an applicator apparatus capable of producing a thin uniform coating. For example, a knife-over-roll coating apparatus may be used. The coating solution will usually be applied at normal room temperature, both the polyurethane film and the coating solution being at the ambient temperature. Immediately following the application of the coating solution, it is preferred to pass the film through a dryer such as a convection air dryer in which the temperature can be controlled to rapidly evaporate the carrier solvent and the attack solvent, leaving the applied resin in a thin layer on the film. The temperature should be limited to temperatures at which the polyurethane film is not appreciably softened. For example, drying temperatures in the range from about 180° to 200° F. can be used. Depending on the desired thickness of the applied coating, multiple coating and drying operations may be desirable. Usually a coating of adequate thickness can be obtained with 2 or 3 applications. The desired thickness of the applied coating is generally within the range from about 0.3 to 1.2 mils, preferred thickness using a sequence of two coating and drying steps being in the range from about 0.3 to 0.8 mils.

After the polyurethane film has been coated on one side, as described, it is then formed into the inflatible bladders by standard manufacturing procedures. The assembley of the bladder is carried out so that the coated side of the film is on the outside of the bladder. For example, the film may be cut in sheets of the approximate size for forming individual bladders. A valve hole is punched in each sheet, the valve is inserted and the sheet is folded with the uncoated side inwardly. The folded sheet is then die cut to the shape of the final bladder, and heat seal is made around the periphery of the bladder. The inside flange of the valve is sealed to the inner surface of the bladder by an adhesive or heat seal, this step being carried out either on insertion of the valve or at the time of bonding the film.

Figure 2:
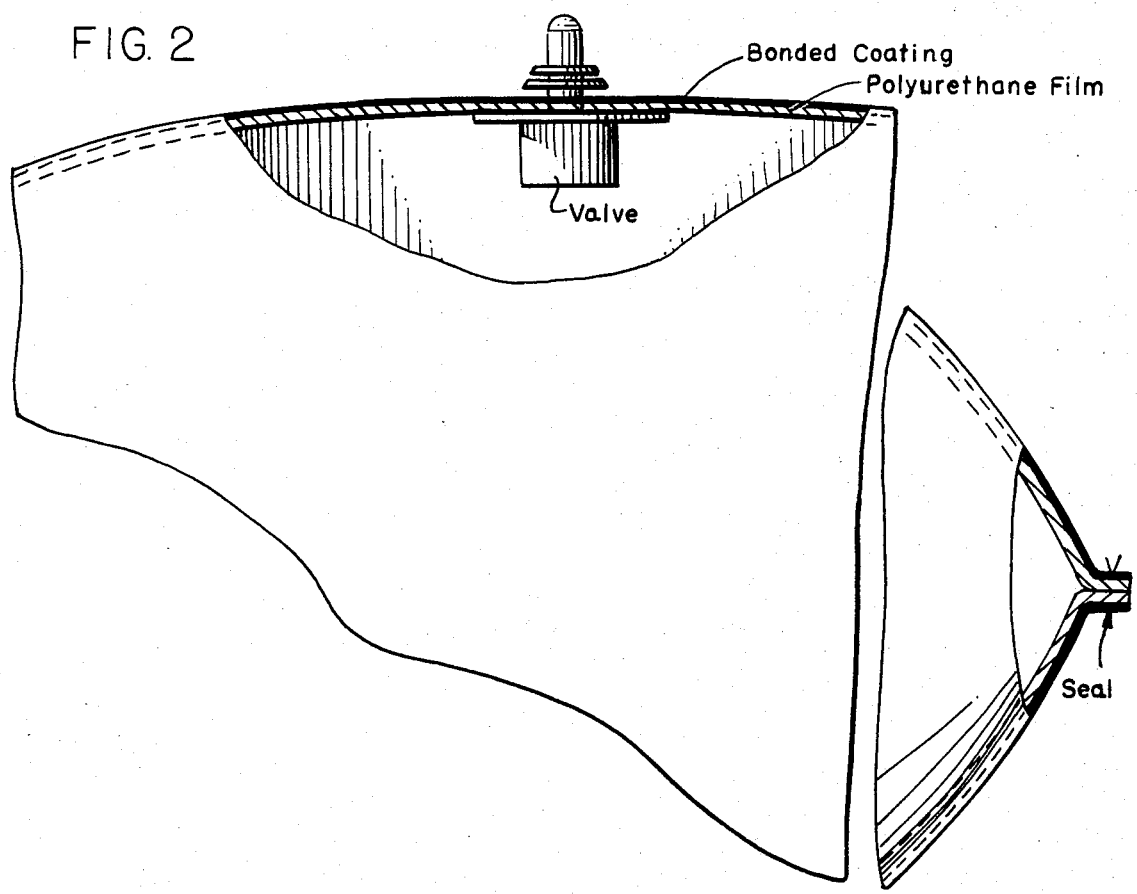
FIG. 2 is a partial fragmentary sectional view taken on line 2—2 of FIG. 1. In both figures the components of the bladder are identified by descriptive labels.

A completed bladder of the type described is illustrated in FIGS. 1 and 2 of the accompanying drawing. The football bladder is shown in a partially inflated condition. The components of the bladder have been given descriptive labels. The following examples further illustrate the invention with respect to football bladders.

EXAMPLE I

The starting material for preparing football bladders is a polyester-based urethane film, such as polyurethane film No. X-1043, Deerfield Industries, South Deerfield, Mass. The film has a thickness of 5 mils with a tolerance of +1 mil. This film is formed by a blow molding extrusion process. It has an air permeability rating of 130 to 140 cc of oxygen per meter$^2$ per 24 hours.

A coating solution is prepared by mixing the following ingredients in the indicated proportions.

| Ingredients | Wt. % |
| --- | --- |
| Coating Resin | 40 |
| MEK | 50 |
| THF | 10 |

The coating resin is a "Saran"-type resin, being a copolymer containing 85% by weight of vinylidine chloride and 15% vinyl chloride. For example, the resin may be Saran F310, Dow Chemical Company, Midland, Mich. The MEK carrier solvent designates methylethyl ketone, and the attack solvent THF designates tetrahydrofuran.

The coating solution is applied at room temperature using a knife-over-roll coating apparatus to one side of the polyurethane film. The coated film moves continuously from the coating station into a dryer where it is subjected to air convection drying at a temperature of 180°-200° F. The drying flashes off the solvents, leaving a dry coating of the resin on the film. After the first coating operation, the coated side of the film is recoated, using the same kind of equipment and the same coating solution. The film moves continuously from the second coating station to a dryer of the same kind previously employed, using the same temperature conditions. Solvents are again flashed off to leave a dried layer of the resin having an approximate thickness of 0.5 mils±0.1 mils. The coated film has an air permeability rating of 1.5 to 4.5 cc of oxygen per meter$^2$ per 24 hours.

The coated film is then used to manufacture the football bladders. In the manufacturing operation, the coated film is drawn off the roll, cut into rectangles, and one side of the rectangle is punched to allow the attachment of the valve. A snap-in type valve is inserted, which has a large flange bearing against the inside, uncoated surface of the polyurethane film. The valve flange is sealed to the surrounding film using a thermal or sonic sealing procedure. The superimposed sides of the bladder are then heat-sealed to each other around their periphery. Radio frequency-type sealing is preferred. The bladder assembley is then diecut to the final shape of the bladder, the line of the diecut being spaced outwardly by a small margin from the line of the seal. Following inspection, the completed bladders are then ready for insertion in footballs.

EXAMPLE II

Coated bladders manufactured as described in Example I were compared for air retention with bladders manufactured from uncoated 5 mil polyurethane film, using the same film and manufacturing procedure. In replicate tests, the average air retention rate of the coated polyurethane bladders had an average air transmission rate of 1.9 cc/24 hours for oxygen) compares with 140 cc/24 hours for oxygen for the uncoated bladders. The air transmission rates are in terms of cubic centimeters per 24 hours period.

EXAMPLE III

Saran-coated polyurethane football bladders prepared as described in Example I were subjected to duration tests. The method of test used was to flex the football in a jig that compressed the ball by ⅓ of its volume (to ⅔ of the volume) and then release it to normal. This constitutes one cycle. The balls (bladders) were tested for 100,000 cycles after aging as follows:
1. One week at 0° F.
2. One week at Room Temperature (72° F.).
3. One week at 158° F.
4. Kicked for 100 kicks at less than 25° F.

The bladders made from saran coated urethane did not fail; whereas the saran-laminated urethane did fail. The laminated saran/urethane was made by heat laminating a 0.005" urethane film to a 0.00075" saran film by the use of heat and pressure. The amount of testing to deleninate and fail the laminated film was about 25,000 cycles or 5 kicks (in the kicking test.) This result compares with that obtained with a co-extruded laminate of Saran and polyurethane.

EXAMPLE IV

Alternate coating solutions which may be used in the same manner as Example III are as follows:

| Ingredients | Wt. % |
| --- | --- |
| Alternate Coating Solution A | |
| Polyamide 6.6 | 28% |
| n-Methyl Pyrodine | 10% |
| Iso-Butyl Alcohol | 62% |
| Alternate Coating Solution B | |
| Ethylene-Vinyl Alcohol | 30% |
| Iso-propyl Alcohol | 60% |
| Di-Methyl Sulfacide | 10% |

I claim:
1. The method of manufacturing bladders for footballs or the like, comprising:
   (a) applying a thin layer of a coating solution to one side of a polyurethane film capable of being formed into inflatable bladders, said film having a thickness of from 3 to 12 mils, said solution consisting essentially of a selected coating resin dissolved in an organic carrier solvent which does not dissolve or react with the polyurethane film, said coating resin being selected from the class consisting of polyvinylidene polymers and copolymers of vinylidene chloride with other vinyl monomers, ethylene vinyl alcohol polymers, and polyamide polymers, said coating solution also containing from 3 to 18% by weight of an organic attack solvent miscible with said carrier solvent and which is capable of dissolving the polyurethane of said filing, said resin being present in a coating concentration;
   (b) rapidly evaporating the solvent from said applied coating solution;
   (c) optionally repeating said applying and evaporating steps, if required, the resulting dried coating comprising a resin layer fused with said polyurethane film and having a thickness of from 0.3 to 1.2 mils; and
   (d) forming said coated film ito inflatable bladders with said coated layers on the outside thereof, whereby high air retention polyurethane bladders are provided which resist impact delamination.

2. The bladders manufactured by the method of claim 1.

3. The method of claim 1 in which said resin is a copolymer of vinylidene chloride and vinyl chloride, said carrier solvent being a ketone solvent and said attack solvent being selected from the class consisting of tetrahydrofuran, dimethyl foramide, and dimethyl sulfoxide.

4. The method of claim 1 in which said attack solvent is present in an amount of from 5 to 15% by weight of said coating solution.

5. The method of claim 1 in which said coating resin is an ethylene vinyl alcohol polymer, said carrier solvent is an alcohol solvent, and said attack solvent is selected from the class consisting of tetrahydrofuran, dimethyl foramide, and dimethyl sulfoxide.

6. The method of claim 1 in which said coating resin is a polyamide resin, said carrier solvent is a mixture of pyrrolidine and a ketone solvent, and said attack solvent is selected from the class consisting of tetrahydrofuran, dimethyl foramide, and dimethyl sulfoxide.

7. The method of manufacturing bladders for footballs or the like, comprising:
   (a) applying a thin layer of a coating solution to one side of a polyurethane film capable of being formed into inflatable bladders, said film having a thickness of from 3 to 12 mils, said solution consisting essentially of a coating resin comprising a copolymer of vinylidine chloride and vinyl chloride dissolved in an organic carrier solvent which does not dissolve or react with the polyurethane film, said coating solution also containing from 5 to 15% by weight of an organic attack solvent miscible with said carrier solvent and which is capable of dissolving the polyurethane of said film, said resin being present in a coating concentration;
   (b) rapidly evaporating the solvent from said applied coating solution;
   (c) optionally repeating said applying and evaporating steps, if required, the resulting dried coating comprising a resin layer effectively fused with said polyurethane film and having a thickness of from 0.3 to 1.2 mils; and
   (d) forming said coated film into inflatable bladders with said coated layers on the outside thereof, whereby high air retention polyurethane bladders are provided which resist impact delamination.

8. The bladders manufactured by the method of claim 7.

9. The method of claim 7 in which said film has a thickness of from 3 to 8 mils and said dried coating has a thickness of from 0.3 to 0.8 mils.

10. The bladders manufactured by the method of claim 9.

* * * * *

UNITED STATES PATENT AND TRADEMARK OFFICE
CERTIFICATE OF CORRECTION

PATENT NO. : 4,513,058
DATED : April 23, 1985
INVENTOR(S) : Robin A. Martin

It is certified that error appears in the above-identified patent and that said Letters Patent is hereby corrected as shown below:

In claim 1, column 6, line 4, cancel "filing" and substitute -- film --; and in column 6, line 13, cancel "ito" and substitute -- into --.

Signed and Sealed this

Thirteenth Day of August 1985

[SEAL]

Attest:

DONALD J. QUIGG

Attesting Officer     Acting Commissioner of Patents and Trademarks